(12) United States Patent
Dewhirst

(10) Patent No.: US 6,940,018 B1
(45) Date of Patent: Sep. 6, 2005

(54) CABLE GUIDE

(76) Inventor: Jeffery Boyd Dewhirst, 2703 Shelby Cir., Muskogee, OK (US) 74403

( * ) Notice: Subject to any disclaimer, the term of this patent is extended or adjusted under 35 U.S.C. 154(b) by 167 days.

(21) Appl. No.: 10/630,412

(22) Filed: Jul. 30, 2003

(51) Int. Cl.[7] ................................................ H01B 3/00
(52) U.S. Cl. .................... 174/68.1; 174/68.3; 174/135; 385/134; 248/68.1
(58) Field of Search .............................. 174/68.1, 68.3, 174/117 F, 74 R, 135, 98, 93; 385/134, 135, 385/86; 248/49, 51, 68.1; 439/207

(56) References Cited

U.S. PATENT DOCUMENTS

| | | | |
|---|---|---|---|
| 4,900,265 A | 2/1990 | Gridley et al. | |
| 5,884,384 A | 3/1999 | Griffioen | |
| 6,036,529 A | * 3/2000 | Brown et al. | 439/445 |
| 6,049,040 A | * 4/2000 | Biles et al. | 174/68.3 |
| 6,134,370 A | * 10/2000 | Childers et al. | 385/135 |
| 6,416,010 B2 | 7/2002 | Fletcher | |
| 6,546,181 B1 | 4/2003 | Adapathya et al. | |
| 6,572,081 B2 | 6/2003 | Griffioen et al. | |
| 6,642,454 B2 | * 11/2003 | Mercier et al. | 174/72 A |
| 6,809,266 B1 | * 10/2004 | Hoi et al. | 174/135 |
| 6,838,612 B2 | * 1/2005 | Krug | 174/21 JR |
| 2002/0141723 A1 | * 10/2002 | Kent et al. | 385/136 |
| 2003/0012527 A1 | 1/2003 | Griffioen et al. | |

* cited by examiner

*Primary Examiner*—Dhiru R. Patel
(74) *Attorney, Agent, or Firm*—Molly D. McKay

(57) ABSTRACT

A cable guide for creating an organized cable bundle. A plurality of channels for receiving cable are provided in a rotating column ring at one end of the cable guide and a cylindrical portion terminates at a flexible boot on the opposite end. A slot in the cable guide extends between the two ends of the guide and can be aligned with the individual channels by rotating the column ring to provide access to the channels to add or remove cable therefrom. Each channel is labeled so that the installer can identify its associated cable. Cable ties that are pre-tied around the cylindrical portion can be slid off the cable guide and around the cable bundle. An alternate embodiment of the invention is provided with a second rotatable ring that effectively separates each channel in two separate compartments for receiving twice as many cables.

11 Claims, 4 Drawing Sheets

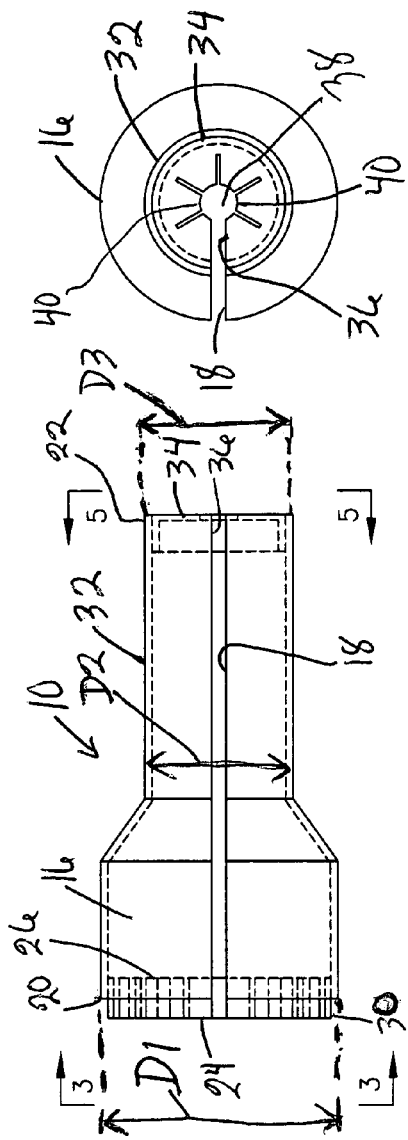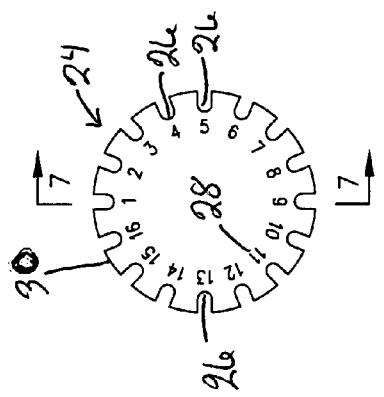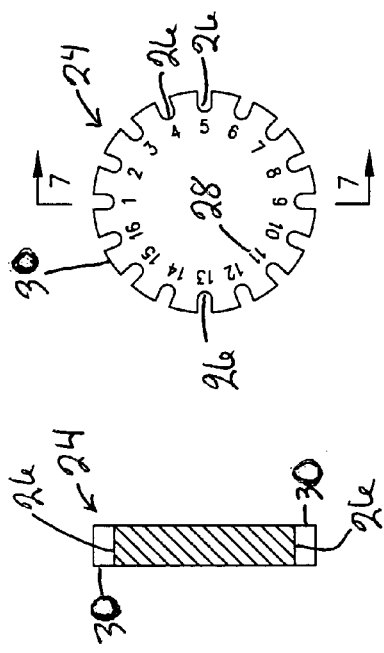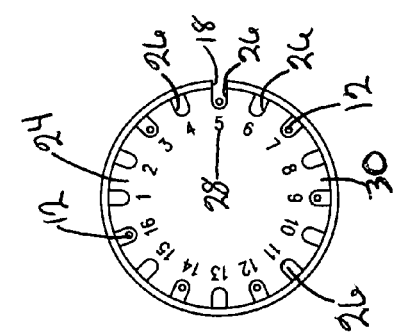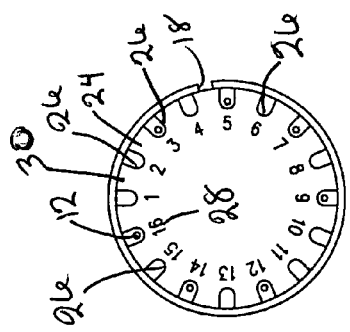

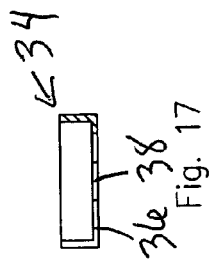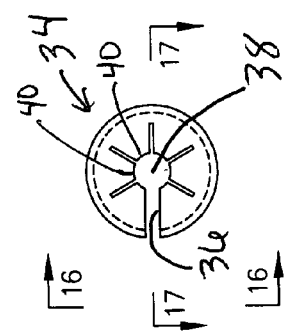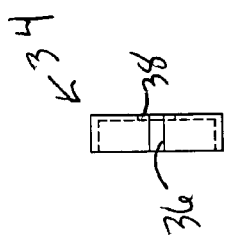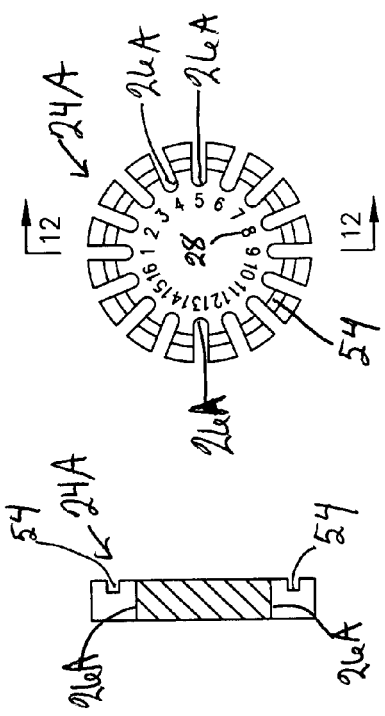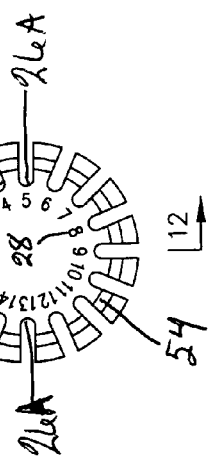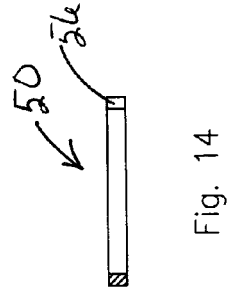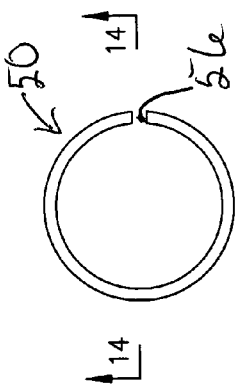

CABLE GUIDE

BACKGROUND OF THE INVENTION

1. Field of the Invention

The present invention relates to a cable guide for bundling a plurality of cables into a neat and organized bundle as the cables are being run in a building as a part of the infrastructure for the building. More specifically, the present invention is a cable guide that can be manually used by a cable installer to manage the installation of cable. The cable guide keeps the cables identified and organized and allows the installer to quickly bundle the cables by sliding cable ties off of the trailing end of the cable guide so that the ties encircle the organized cable bundle. Also, the cable guide is provided with a side slot that allows the installer to easily add or remove cable from the bundle as the bundle is formed, thereby allowing cable to be run to new cable jacks within the building.

2. Description of the Related Art

The largest cost in installing cables as part of the infrastructure in a building is the labor costs associated with running the cables. The installation of cables in a building is time consuming because the installer must manually bundle a plurality of cables and place cable ties around the bundle at spaced apart intervals so that the cable bundle will remain orderly and can be installed in a minimum amount of space within the walls or above the ceiling of the building. Manually keeping a plurality of cables organized and together is a straight configuration while the bundle is made up is challenging because the cable that has previously been wound onto spools for storage tends to get tangled and disorganized.

Another problem that installers face when running cable is that they need to be able to identify each cable as the cable bundle is being created so that the proper cable can be run out of the bundle at the proper place so that it can be run to the proper location within the building. When management of the cable is done manually, it is hard to keep track of each individual cable that is contained within a bundle.

The present invention addresses this problem by providing a cable guide that can be used by the installer to quickly manually bundle cable in a straight, organized bundle, while continually keeping each cable identified. The invention is provided on one end with a plurality of openings or channels for receiving the individual cables that will make up the finished cable bundle. The invention is provided on that same end with one or more movable rings that, depending on the relative position of the ring or rings, will permit access to each of the individual channels or alternately prohibit access to the individual channels. The movable ring or rings allow individual cables to be added to, removed from, or maintained within the cable guide, as desired.

Each channel is labeled so that the installer can identify each cable by the channel identifying mark associated with the channel into which the cable is inserted.

An opposite end of the cable guide is provided with a cylindrical portion that terminates with a boot that squeezes the cable into a tight bundle as the cable exits the cable guide. Cable ties can be pre-tied around the cylindrical portion so that as the cable guide is pulled in the direction of the first end relative to the cable, the cable ties can be slid off of the cylindrical portion and around the tightly squeezed bundle at spaced apart intervals along the cable bundle. As the cable ties are slid onto the cable bundle, the installer will pull each cable tie to tighten it around the cable bundle, thereby securing the cable bundle in the organized manner that it was placed into the channels on the opposite first end of the cable guide.

The present cable guide is easy to use and can save the cable installer as much as 70–80% on the time needed to install cable in a building, thereby significantly reducing the cast of cable installation.

SUMMARY OF THE INVENTION

The present invention is a cable guide that can be used by a cable installer to quickly manually bundle cable in a straight, organized bundle, while continually keeping each cable identified. The invention is provided on one end with a plurality of channels for receiving the individual cables that will make up the finished cable bundle. Each channel is labeled so that the installer can identify each cable by the channel identifying mark associated with the channel into which the cable is inserted.

The invention is provided on that same end with one or more movable rings that, depending on the relative position of the ring or rings, will permit access to each of the individual channels or alternately prohibit access to the individual channels. The movable ring or rings allow individual cables to be added to, removed from, or maintained within the cable guide, as desired.

An opposite end of the cable guide is provided with a cylindrical portion that terminates with a flexible boot. The flexible boot squeezes the cable into a tight bundle as the cable exits the second end of the cable guide. Cable ties can be pre-tied around the cylindrical portion so that as the cable guide is pulled relative to the cable in the direction of the first end of the cable guide, the cable ties can be slid off of the cylindrical portion and around the tightly squeezed bundle at spaced apart intervals along the cable bundle. As the cable ties are slid onto the cable bundle, the installer will pulled each cable tie to tighten it around the cable bundle, thereby securing the cable bundle in the organized manner that the cables were originally placed into the channels that are located on the opposite first end of the cable guide.

BRIEF DESCRIPTION OF THE DRAWINGS

FIG. 2 is a side view of the cable guide of FIG. 1.

FIG. 3 is an end view of the cable guide taken along line 3—3 of FIG. 2, showing a column ring turned to align one of the column openings with a slot provided longitudinally through the body of the cable guide, thereby providing access to column opening number 5.

FIG. 4 is an end view similar to FIG. 3, showing the column ring turned so that it does not align with any of the column openings, thereby preventing access to all the column openings.

FIG. 5 is an opposite end view of the cable guide taken along line 5—5 of FIG. 2 showing a flexible boot attached to the body of the cable guide.

FIG. 6 is an end view of the column ring of FIGS. 3 and 4 shown removed from the body of the cable guide.

FIG. 7 is a cross sectional view of the column ring taken along line 7—7 of FIG. 6.

FIG. 11 is an end view of the alternate column ring of FIGS. 9 and 10 shown removed from the body of the alternate embodiment cable guide.

FIG. 12 is a cross sectional view of the alternate column ring taken along line 12—12 of FIG. 11.

FIG. 13 is an end view of the separating ring of FIGS. 9 and 10 shown removed from the alternate embodiment cable guide to which it normally is rotatably secured.

FIG. 14 is cross sectional view of the separating ring taken along line 14—14 of FIG. 13.

FIG. 15 is an end view of the flexible boot of FIG. 5 shown removed from the body of the cable guide.

FIG. 16 is a cross sectional view of the flexible boot taken along line 16—16 of FIG. 15.

FIG. 17 is a cross sectional view of the flexible boot taken along line 17—17 of FIG. 15.

DETAILED DESCRIPTION OF THE PREFERRED EMBODIMENT THE INVENTION

Figure 1:
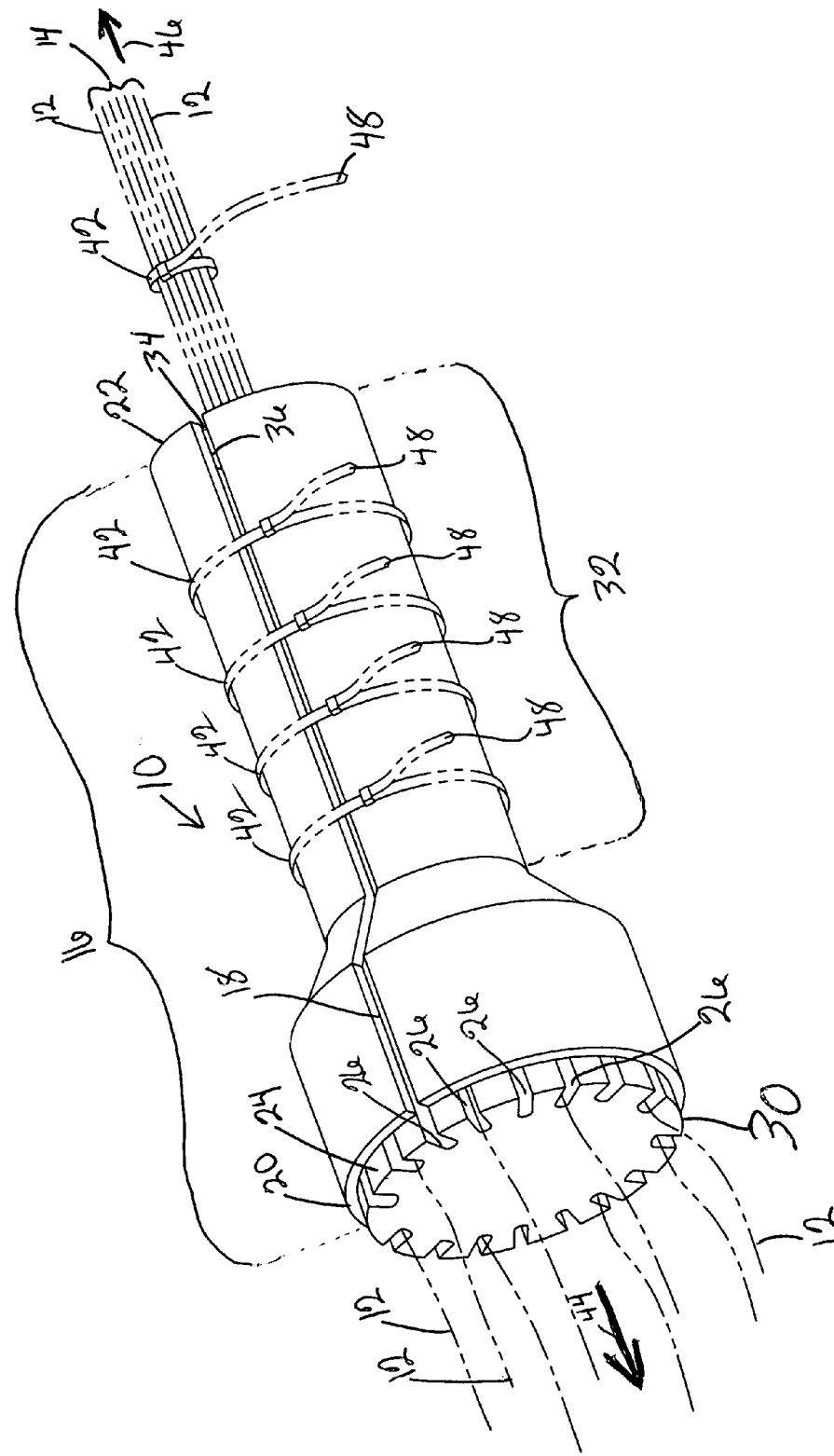
FIG. 1 is a perspective view of a cable guide constructed in accordance with a preferred embodiment of the present invention shown with cable ties secured around a cylindrical end of the cable guide and the cable guide in use in creating a cable bundle.
Figure 8:
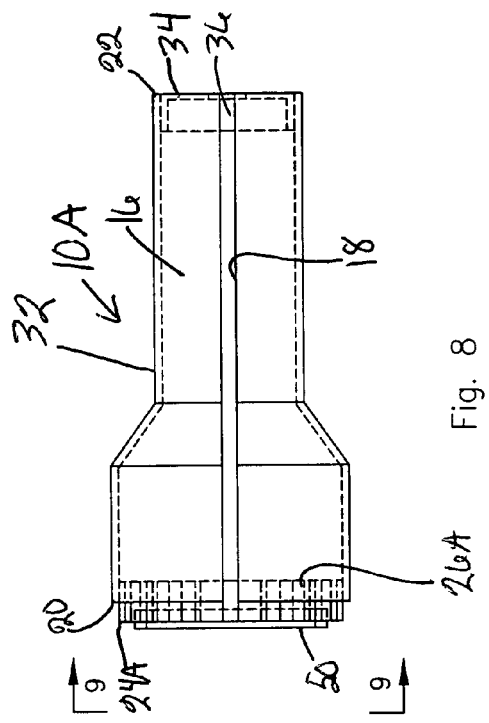
FIG. 8 is a side view of an alternate embodiment cable guide that is designed to accommodate two cables in each of the column openings that are provided in an alternate column ring.
Figure 9:
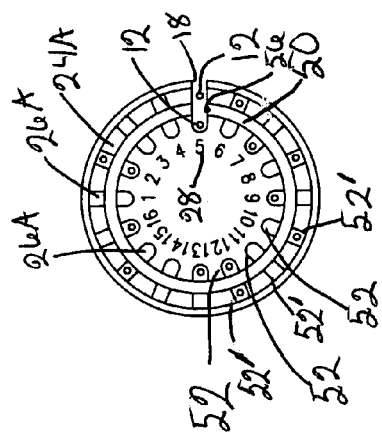
FIG. 9 is an end view of the alternate embodiment cable guide taken along line 9—9 of FIG. 8 showing an alternate column ring turned to aligned one of the column openings with a slot provided longitudinally through the body of the cable guide and showing a separating ring turned to align the same column opening with a slot provided in the separate ring, thereby providing access to an inner half of column opening number 5.
Figure 10:
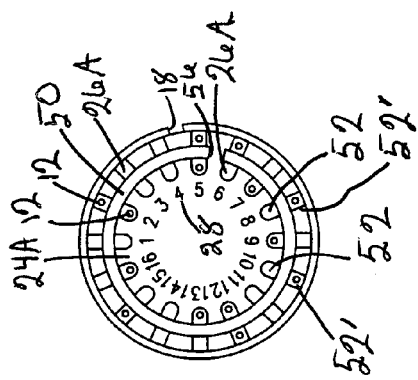
FIG. 10 is an end view of the alternate embodiment cable guide similar to FIG. 9, showing the alternate column ring and the separate ring turned so that neither aligns with any of the column openings, thereby preventing access to all the column openings.

Referring now to the drawings and initially to FIGS. 1 and 2, there is illustrated a cable guide 10 that is constructed in accordance with a preferred embodiment of the present invention. As shown in FIG. 1, the cable guide 10 is to be employed by a cable installing user to quickly and easily manually secure cables 12 into a straight, organized bundle 14, while continually keeping each cable 12 separately identified.

The cable guide 10 has a hollow body 16 that is can be grasped by the user when using the cable guide 10. The body 16 is provided with a longitudinal slot 18 that extends through a side wall 20 of the body 16, and the slot 18 is continuous from a first end 20 of the body 16 to an opposite second end 22 of the body 16.

Referring now to FIG. 2, the body 16 preferably narrows in diameter between the first end 20 and the cylindrical portion 32 so that a diameter D1 of the first end 20 exceeds a diameter D2 of the cylindrical portion 32. Also the diameter D2 of the cylindrical portion 32 is approximately the same as a diameter D3 of the second end 20.

Referring also to FIGS. 3, 4, 6 and 7, a column ring 24 is rotatably provided on the first end 20 of the body 16. The column ring 24 is provided with a plurality of column openings or channels 26 for removably receiving individual cables 12 that will be used in making up the finished cable bundle 14. Each channel 26 is provided with an alphanumeric label or mark 28 so that the user can identify each cable 12 by the channel identifying mark 28 associated with the channel 26 into which the cable 12 is inserted.

The channels 26 are provided in a spaced apart arrangement around an outer edge 30 of the column ring 24, with each channel 26 being open at the outer edge 30 of the column ring 24. Each of the channels 26 can sequentially be accessed by turning the column ring 24 relative to the body 16 so that the desired channel 26 is aligned with the longitudinal slot 18 of the body 16. Thus, a cable 12 can either be inserted into, or alternately, removed from a channel 26 by first turning the column ring 24 so that the desired channel 26 is aligned with the slot 18, and then either inserting a cable 12 through the slot 18 into the desired channel 26, or alternately, removing a cable 12 from the channel 26 into which the cable 12 was previously inserted by removing the cable via the slot 18.

After the cable 12 has either been added to a channel 26 or removed therefrom, the column ring 24 is again rotated so that none of the channels 26 align with the slot 18. When the column ring 24 is thus positioned, access to all channels 26 is prevented and any cables 12 that were previously inserted into channels 26 of the column ring 24 will thus be retained within the cable guide 10.

Referring now to FIGS. 2, 5, and 15–17, the body 16 of the cable guide 10 is provided with a cylindrical portion 32 located adjacent the second end 22 of the body 16. A flexible boot 34 attaches to the second end 22 of the body 16. The flexible boot 34 is provided with a boot slot 36 that aligns with and is continuous with the slot 18 of the body 16. The boot slot 36 extends to and is continuous with a central opening 38 provided in the boot 34. The boot 34 is preferably constructed of a flexible material such as rubber and is provided with flexible fingers 40 that extend into the central opening 38 of the boot 34. The purpose of the central opening 38 and its associated fingers 40 is to gently squeeze the cables 12 that are movably contained within the cable guide 10 into a tight bundle 14 as the cables 12 exits the second end 22 of the cable guide 10 via the central opening 38 in the boot 34. The boot slot 36, which is aligned with the slot 18 in the body 16, allows cables 12 to be removed or added to the central opening 38 of the boot 34 whenever the cables 12 are removed or added to the cable guide 10, as has been previously described.

Cable ties 42 are pre-tied by the user around the cylindrical portion 32 of the body 16, as shown in FIG. 1, so that the pre-tied cable ties 42 extend around the cylindrical portion 32 of the body 16. When the cable guide 10 is in use, the cables 12 are pulled through the cabled guide 10, or alternately, the cable guide 10 is pulled relative to the cables 12 so that the cable guide 10 moves in the direction of the first end 20 of the cable guide, as illustrated by arrow 44 in FIG. 1, or stated another way, the cables 12 move in the direction of the second end 22 of the cable guide 10, as illustrated by arrow 46 in FIG. 1. As the cables 12 exit the boot 34 on the second end 22 of the cable guide 10, the previously pre-tied cable ties 42 can be individually slid off of the cylindrical portion 32 by the user at spaced apart intervals along the cable bundle 14 so that the cable ties 42 encircle the tightly squeezed bundle 14 as they are slipped off the cylindrical portion 32. As the cable ties 42 are slid onto the cable bundle 14, the user will pull a free end 48 of each cable tie 42 to tighten it around the cable bundle 14, thereby securing the cable bundle 14 in the organized manner that the cables 12 were originally placed into the channels 26 of the cable guide 10.

Referring now to FIGS. 8–14, an alternate embodiment cable guide 10A will be described. The alternate embodiment cable guide 10A is identical to the preferred cable guide 10 except it is provided with an alternate column ring 24A that replaces the column ring 24 of the preferred embodiment and the alternate embodiment cable guide is also provided with an additional separating ring 50 not provided on the preferred cable guide 10. The separating ring 50 is rotatably secured to the alternate column ring 24A, as will hereafter be more fully explained.

The alternate embodiment cable guide 10A is capable of receiving twice as many cables 12 as the preferred cable guide 10 because the separating ring 50 effectively divides each of the alternate channels 26A provided in the alternate column ring 24A in half, with each of the halves 52 and 52' capable of holding an individual cable 12. The separating ring 50 thus creates an inner half 52 and with an outer half 52' for each alternate channel 26A.

As illustrated in FIGS. 11–14, the separating ring 50 is rotatably secured in a groove 54 provided in the alternate embodiment column ring 24A and is provided with a ring opening 56 that can be sequentially aligned with each of the alternate channels 26A to thereby provide access from the outer half 52' of the channel to the inner half 52 of the alternate channel 26A.

Thus to access an alternate channel 26A of the alternate embodiment cable guide 10A, the alternate column ring 24A is rotated to align the desired alternate channel 26A with the slot 18 in the body 16. Then if the inner half 52 of the desired alternate channel 26A is to be accessed, the separating ring 50 is rotated so that the ring opening 56 of the separating ring 50 is aligned with the desired alternate channel 26A, thereby moving the separating ring 50 out of the alternate channel 26A and allowing access to both halves 52' and 52 of the alternate channel 26A. At this point a cable 12 can either be added to the desired half 52 or 52' of the alternate channel 26A or removed therefrom. To once again close access to the alternate channels 26A and between the halves 52 and 52' of the alternate channels 26A, both the separating ring 50 and the alternate embodiment column ring 24A are turn so that the rings 50 and 24A do not align with any of the alternate channels 26A.

Although the separating ring 50 for the alternate embodiment cable guide 10A has been described as attaching to a groove 54 provided in the alternate embodiment column ring 24, the invention is not so limited. The invention is understood to include any means of partitioning the alternate channels 26 into two or more compartments or halves 52, 52', etc. that are each capable of receiving a cable 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A cable guide comprising:
  a hollow body, said body provided with a slot that extends through the hollow body and extends between first and second ends of the body to allow cables to be added or removed from the body,
  a column ring provided on said first end of said body, said column ring provided with channels on its outer edge for removably receiving said cables within the channels, said column ring being rotatable so that each channel can sequentially align with said slot to provide access to each channel, and
  the body provided with a cylindrical portion adjacent the second end onto which cable ties can be pre-tied in preparation for slipping the cable ties off the second end and around said cables as the cables exit the second end.

2. A cable guide according to claim 1 further comprising:
  a flexible boot secured to said second end for squeezing the cables into a bundle as they exit the second end.

3. A cable guide according to claim 2 further comprising:
  said flexible boot provided with a boot slot that extends through the boot, said boot slot being aligned with said slot in the body.

4. A cable guide according to claim 3 further comprising:
  said flexible boot provided with a central opening that is continuous with the boot slot.

5. A cable guide according to claim 4 further comprising:
  flexible fingers extending into said central opening as a means of squeezing cables into a bundle as the cables exit the second end.

6. A cable guide according to claim 5 wherein the flexible boot is smaller than the second end so that cable ties that are pre-tied around the cylindrical portion of the body can be slid off of the second end.

7. A cable guide according to claim 1 wherein the first end has a larger diameter than the second end.

8. A cable guide according to claim 7 wherein the cylindrical end had a diameter approximately the same as the diameter of the second end.

9. A cable guide according to claim 1 further comprising:
  a separating ring provided on the first end so that the separating ring divides each channel into an inner half and an outer half, said separating ring provided with a ring opening extending through the separating ring, said separating ring being rotatable so that the ring opening sequentially aligns with each channel to provide access between the inner half and the outer half for each channel.

10. A cable guide according to claim 1 further comprising:
  a mark provided on said column ring in association with each channel to identify the channel and cable contained within the channel.

11. A cable guide according to claim 1 wherein the channels are spaced apart from each other so that the slot in the body can be positioned so that it does not align with any of the channels as a means of retaining cable within the channels.

* * * * *